F. A. HENNY AND C. E. HENDRICKS.
SAW.
APPLICATION FILED JAN. 27, 1920.
1,403,411. Patented Jan. 10, 1922.
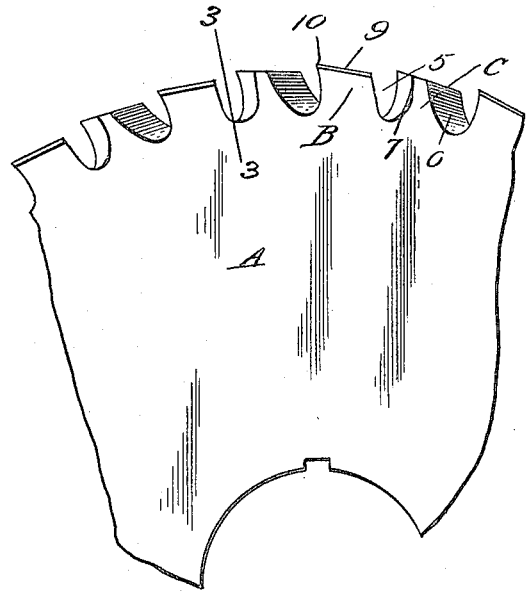
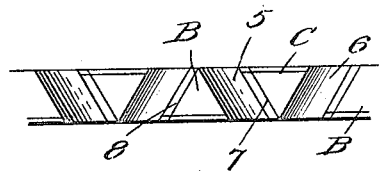
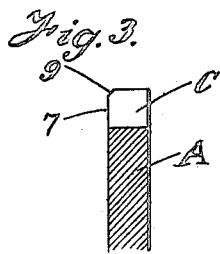
Inventor
F. A. Henny and C. E. Hendricks.
By Geo. P. Kimmel
Attorney

UNITED STATES PATENT OFFICE.

FRANK A. HENNY AND CHARLES E. HENDRICKS, OF FLINT, MICHIGAN.

SAW.

1,403,411.  Specification of Letters Patent.  Patented Jan. 10, 1922.

Application filed January 27, 1920. Serial No. 354,493.

*To all whom it may concern:*

Be it known that we, FRANK A. HENNY and CHARLES E. HENDRICKS, citizens of the United States, residing at Flint, in the county of Genesee and State of Michigan, have invented certain new and useful Improvements in Saws, of which the following is a specification.

The invention relates to a saw and more particularly to the class of saws for slitting, cutting off and milling metals.

The primary object of the invention is the provision of a saw of this character, wherein the teeth thereof are of novel form to eliminate the chattering and vibration of the blade when used in cutting metals and also avoiding wear upon the teeth as the corners of the teeth alternately are chamfered to distribute the wear of sharp points.

Another object of the invention is the provision of a saw of this character, wherein the particular formation of the teeth prevents the splitting of the blade.

A further object of the invention is the provision of a saw of this character wherein the same will free itself of chips and waste.

A still further object of the invention is the provision of a saw of this character wherein the teeth at the cutting edges thereof can be sharpened and changed in event of the breaking off of the same by chipping or otherwise, the saw being of simple construction and inexpensive to manufacture.

Other objects will be in part obvious and in part hereinafter fully pointed out.

The invention accordingly consists in the elements and arrangement of parts, the construction of which will be simplified in the description hereinafter fully set forth and the scope of the application of which will be indicated in the claims hereunto appended.

In the accompanying drawing,

Figure 1 is a fragmentary side elevation of a portion of a circular saw blade constructed in accordance with the invention.

Fig. 2 is an edge view thereof.

Fig. 3 is a fragmentary cross-section on line 3—3 of Fig. 1.

Similar reference characters indicate corresponding parts throughout the several views in the drawing.

Referring to the drawing in detail, A designates a portion of a saw blade which is adapted to be of a size and is fastened in a metal worker's machine in accordance with standard types. The blade A at its peripheral edge is formed with cutting teeth B and C, respectively, alternately disposed in the series thereof. The teeth B and C are of reverse triangular shape in cross section in their alternate relation to each other by forming channels or grooves 5 and 6 therebetween which are arranged angularly transversely of the blade A in reverse directions to each other, the width of said grooves and the angular disposition thereof serving to determine the size of the tooth therebetween.

The groove or channel 5 presents to the tooth C a right hand angular cutting edge 7 while the groove or channel 6 presents to the tooth B a left hand angular cutting edge 8, the depth of these grooves 5 and 6 being equal to the cutting width of each tooth.

The teeth B and C have their two corners chamfered at 9 approximately ten per cent of the width of every other cutting edge to provide a point 10, the respective points of the teeth being alternately staggered as is clearly apparent in Figure 1 of the drawing.

In event that the teeth B and C become chipped or broken off the cutting edges of said teeth can be renewed and changed by backing off for clearance, the angles of the teeth determining the direction of rotation of the blade A. The right and left hand angles of the cutting edges 7 and 8 of the grooves 5 and 6 of the teeth cause the blade to free itself of chips, the grooves 5 and 6 preventing the splitting of the blade, while the chamfered surfaces of said teeth distributes the wear on the points 10 as will be clearly apparent.

From the foregoing it is thought that the manner of operation of the blade will be clearly understood and therefore a more extended explanation has been omitted.

What is claimed is:—

1. A saw of the character described comprising a blade formed with reversely disposed angular grooves transversely therein and opening through the edge of the same, said grooves being of a depth equal to the width of the blade to provide spaced teeth of triangular shape presenting alternate right and left hand angular cutting edges, and reversely disposed chamfered surfaces formed on the teeth to provide cleaning points in staggered relation to each other.

2. A saw of the character described comprising a blade formed with reversely disposed angular grooves transversely therein and opening through the edge of the same, said grooves being of a depth equal to the width of the blade to provide spaced teeth of triangular shape presenting alternate right and left hand angular cutting edges, and reversely disposed chamfered surfaces formed on the teeth to provide cleaning points in staggered relation to each other, said grooves being formed with bottoms each having a width equal to the width of the cutting edge of the tooth next thereto.

In testimony whereof, we affix our signatures hereto.

FRANK A. HENNY.
CHARLES E. HENDRICKS.